(12) United States Patent
Mennenga et al.

(10) Patent No.: US 7,187,724 B2
(45) Date of Patent: Mar. 6, 2007

(54) AVERAGE TRACKING MECHANISM IN DATA COMMUNICATIONS RECEIVERS

(75) Inventors: Menno Mennenga, Dresden (DE); Uwe Eckhardt, Dresden (DE); Michael Schmidt, Dresden (DE)

(73) Assignee: Advanced Micro Devices, Inc., Sunnyvale, CA (US)

( * ) Notice: Subject to any disclaimer, the term of this patent is extended or adjusted under 35 U.S.C. 154(b) by 905 days.

(21) Appl. No.: 10/285,925

(22) Filed: Nov. 1, 2002

(65) Prior Publication Data

US 2004/0001562 A1    Jan. 1, 2004

(30) Foreign Application Priority Data

Jun. 28, 2002    (DE)    ................. 102 29 002

(51) Int. Cl.
*H03K 9/00*    (2006.01)
(52) U.S. Cl. .................................................... 375/316
(58) Field of Classification Search ................ 375/316, 375/343, 345, 259, 260, 341, 367, 149–150; 370/389, 465
See application file for complete search history.

(56) References Cited

U.S. PATENT DOCUMENTS

| | | | | |
|---|---|---|---|---|
| 4,684,922 A | * | 8/1987 | Minogue ..................... | 341/122 |
| 4,756,007 A | * | 7/1988 | Qureshi et al. ............. | 375/259 |
| 5,260,976 A | * | 11/1993 | Dolivo et al. ............... | 375/341 |
| 5,297,185 A | * | 3/1994 | Best et al. ................... | 375/368 |
| 6,038,267 A | * | 3/2000 | Oura et al. .................. | 375/329 |
| 6,718,355 B2 | * | 4/2004 | Felts et al. .................. | 708/319 |
| 6,724,834 B2 | * | 4/2004 | Garrett et al. .............. | 375/317 |
| 6,748,031 B1 | * | 6/2004 | Piirainen .................... | 375/340 |
| 6,909,760 B2 | * | 6/2005 | Borowski et al. .......... | 375/367 |
| 6,993,100 B2 | * | 1/2006 | Yang et al. ................. | 375/342 |
| 7,035,352 B1 | * | 4/2006 | Malone et al. ............. | 375/334 |
| 2005/0207506 A1 | * | 9/2005 | Iwami ........................ | 375/260 |

FOREIGN PATENT DOCUMENTS

EP    0539526    11/1994

OTHER PUBLICATIONS

Lacrois, Arild: Digitale Filter, 1985, $2^{nd}$ edition, Munich and others, R. Oldenbourgverlag, ISBN 3-486-214020, pp. 24, 24-37 and 58.
Einfhurung in die digitale Signalverarbeitung, 1990, Stuttgart, Teubner Verlag, ISBN 3-519-00117-9, p. 73-80, p. 184-210.
English Translation of Official Communication regarding German patent application No. 10229002.4-31, issued Nov. 3, 2003.

* cited by examiner

*Primary Examiner*—Emmanuel Bayard
*Assistant Examiner*—Lawrence B. Williams
(74) *Attorney, Agent, or Firm*—Meyertons Hood Kivlin Kowert & Goetzel, P.C.; B. Noël Kivlin

(57) ABSTRACT

An average tracking mechanism for a data communication receiver is provided. The average tracking mechanism of the receiver is connected to receive an input stream of data samples and is adapted to keep track of an average over a predefined number of most recently received data samples. The average tracking mechanism comprises a calculation unit that is adapted to calculate an approximate value of the average and a storage unit for storing calculated approximate values. The calculation unit is adapted to calculate the approximate value by retrieving a previously calculated approximate value from the storage unit and calculating a weighted sum of the retrieved approximate value and a current data sample. The average approximation technique may be used in a comb filter of a preamble detector in a WLAN receiver.

41 Claims, 4 Drawing Sheets

AVERAGE TRACKING MECHANISM IN DATA COMMUNICATIONS RECEIVERS

BACKGROUND OF THE INVENTION

1. Field of the Invention

The invention generally relates to receivers in data communication systems, and in particular to receivers and operation methods having an average tracking mechanism.

2. Description of the Related Art

A wireless local area network is a flexible data communications system implemented as an extension to or as an alternative for, a wired LAN. Using radio frequency or infrared technology, WLAN (Wireless Local Area Network) systems transmit and receive data over the air, minimizing the need for wired connections. Thus, WLAN systems combine data connectivity with user mobility.

Today, most WLAN systems use spread spectrum technology, a wide-band radio frequency technique developed for use in reliable and secure communication systems. The spread spectrum technology is designed to trade-off bandwidth efficiency for reliability, integrity and security. Two types of spread spectrum radio systems are frequently used: frequency hopping and direct sequence systems.

The standard defining and governing wireless local area networks that operate in the 2.4 GHz spectrum, is the IEEE 802.11 standard. To allow higher data rate transmissions, the standard was extended to 802.11b that allows data rates of 5.5 and 11 Mbps in the 2.4 GHz spectrum. This extension is backwards compatible.

When operating a WLAN receiver or a receiver in another data communications system, code synchronization is necessary because the code is the key to despreading the desired information. Generally, a good synchronization is achieved when the coded signal arriving at the receiver is accurately timed in both its code pattern position and its rate of chip generation.

Referring now to FIG. 1, a block diagram of a conventional WLAN receiver 100 is shown. Via one or more antennae 110 the receiver receives a data stream from a WLAN transmitter and feeds the antenna output to a signal pre-processing unit 120. The received data signals are pre-processed in the signal pre-processing unit 120 and then handed over to the synchronization unit 130. After synchronizing the received data signals the synchronized data signals are handed over to the digital signal processing unit 140 for further digital signal processing.

When synchronizing received data signals as well as when performing other pre-processing or processing operations in data communication receivers, it might be necessary to have a smoothing mechanism that averages the amplitudes of incoming data samples and keeps track of this running average. For calculating the average value, conventional receivers need to buffer a number of most recently received samples and have to continuously update the buffer contents. In particular if several average values have to be calculated separately which all relate to the incoming data stream, and further if the data samples are complex data samples, a significantly high number of buffer registers are required, leading to a high die area occupation. This reduces the overall efficiency and increases the circuit development and manufacturing costs.

SUMMARY OF THE INVENTION

An improved average tracking mechanism for a data communication receiver is provided that may have a significantly reduced gate count, i.e. a decreased amount of hardware components required to implement the mechanism on an integrated circuit chip, thus leading to noticeable cost savings.

In one embodiment, a receiver is provided for receiving data in a data communication system. The receiver comprises an average tracking mechanism connected to receive an input stream of data samples and adapted to keep track of an average over a predefined number of most recently received data samples. The average tracking mechanism comprises a calculation unit that is adapted to calculate an approximate value of the average. The average tracking mechanism further comprises a storage unit for storing calculated approximate values. The calculation unit is adapted to calculate the approximate value by retrieving a previously calculated approximate value from the storage unit and calculating a weighted sum of the retrieved approximate value and a current data sample.

In another embodiment, there may be provided an integrated circuit chip having average tracking circuitry that is connected to receive an input stream of data samples and that is adapted to keep track of an average over a predefined number of most recently received data samples. The average tracking circuitry comprises a calculation circuit adapted to calculate an approximate value of the average, and a storage circuit for storing calculated approximate values. The calculation circuit is adapted to calculate the approximate value by retrieving a previously calculated approximate value from the storage circuit and calculating a weighted sum of the retrieved approximate value and a current data sample.

According to a further embodiment, there is provided a method of operating a receiver in a data communications system. The method comprises receiving an input stream of data samples, and performing an average tracking process to keep track of an average over a predefined number of most recently received data samples. The average tracking process comprises retrieving a stored, previously calculated approximate value of the average, and calculating a current approximate value by calculating a weighted sum of the retrieved approximate value and a current data sample.

BRIEF DESCRIPTION OF THE DRAWINGS

The accompanying drawings are incorporated into and form a part of the specification for the purpose of explaining the principles of the invention. The drawings are not to be construed as limiting the invention to only the illustrated and described examples of how the invention can be made and used. Further features and advantages will become apparent from the following and more particular description of the invention, as illustrated in the accompanying drawings, wherein.

DETAILED DESCRIPTION OF THE INVENTION

The illustrative embodiments of the present invention will be described with reference to the figure drawings wherein like elements and structures are indicated by like reference numbers.

Figure 1:
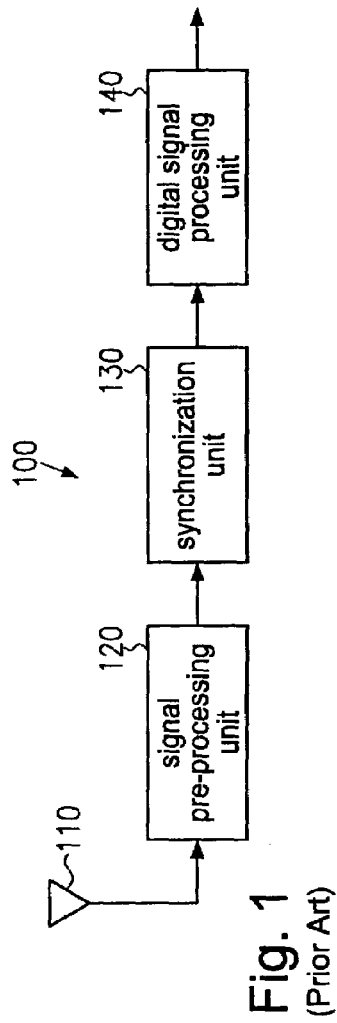
FIG. 1 is a block diagram schematically illustrating the components of a conventional data communications receiver.
Figure 2:
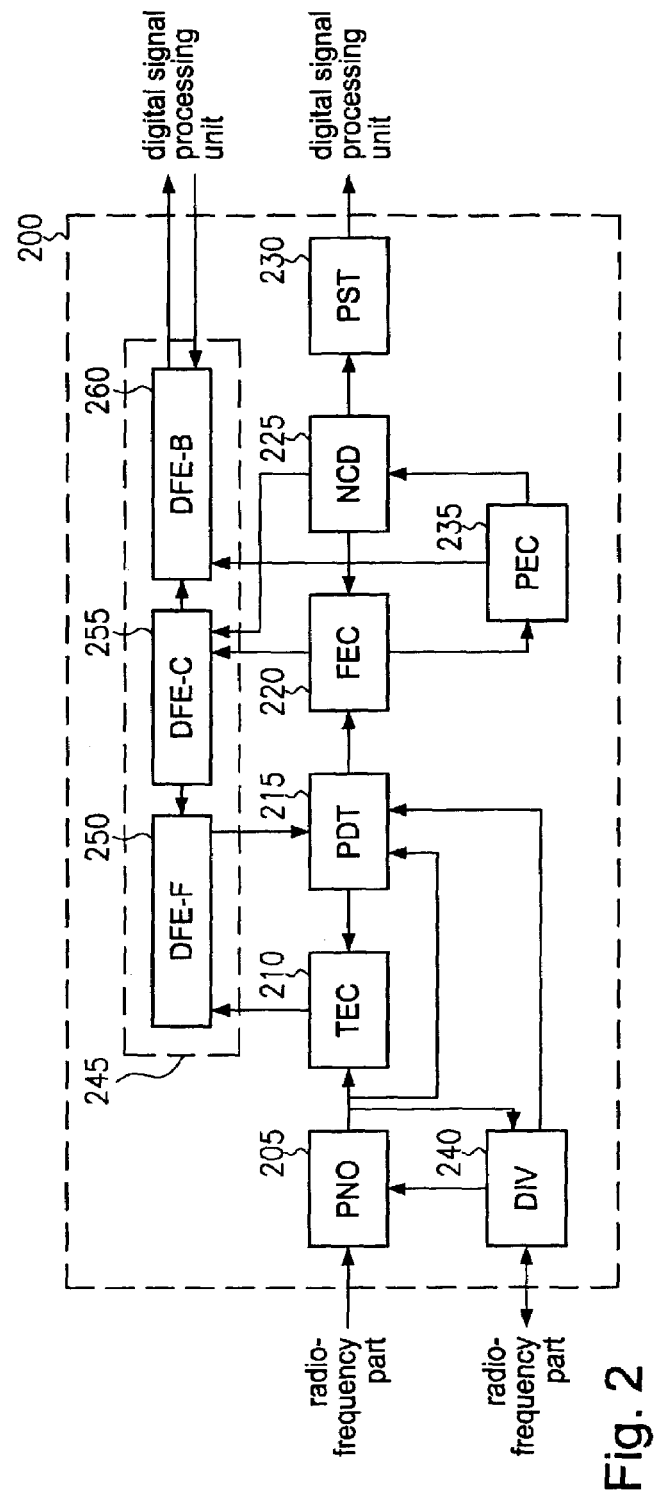
FIG. 2 illustrates the components of a WLAN receiver according to an embodiment.

Referring now to the drawings and particular to FIG. 2 which illustrates the components of a WLAN receiver according to an embodiment, the receiver comprises a baseband part 200 that is connected to a radio-frequency part. The radio-frequency part may be an analog circuit that receives an analog signal and provides a digitized representation thereof to the baseband part 200. Moreover, the radio-frequency part may perform an automatic gain control to control the amplification gain dependent on the received signal power or strength. The automatic gain controller is located in the analog radio-frequency part and interchanges control signals with the digital circuitry of the baseband part 200.

The baseband part 200 of the WLAN receiver of the present embodiment shown in FIG. 2 has a number of units that are interconnected to form a data path. That is, the baseband part 200 receives the digitized input signal from the radio-frequency part and generates output data that is to be filtered, demodulated, decoded and descrambled for further processing.

When receiving the digitized input signal in the baseband part 200, a power normalization (PNO) is performed in unit 205 to normalize the power of the input signal. The power normalization may be performed under control of a diversity selection (DIV) unit 240 that controls antenna diversity and which is connected to the automatic gain controller of the radio-frequency part. For performing the diversity selection, the diversity selection unit 240 receives the normalized signal from the power normalization unit 205.

The diversity selection unit 240 may further provide a control signal to a preamble detection (PDT) unit 215. The preamble detection unit 215 receives the normalized signal from the power normalization unit 205 and detects a preamble in this signal. A preamble is a special signal pattern used for synchronization acquisition.

As may be seen from FIG. 2, the preamble detection unit 215 provides output signals to a timing error correction (TEC) unit 210 and a frequency error correction (FEC) unit 220. These units are used to detect and correct timing errors and frequency errors, respectively.

As mentioned above, the preamble detection unit 215 receives the normalized input signal from power normalization unit 205. The feedforward filter 250 receives the output signal of the timing error correction unit 210 and filters this signal under control of decision feedback equalization controller (DFE-C) 255. The filtered signal is fed to the preamble detection unit 215.

As can further be seen from FIG. 2, the decision feedback equalization controller 255 may operate dependent on certain input signals that are received from the frequency error correction unit 220 and/or a non-coherent detection (NCD) unit 225. The non-coherent detection unit 225 filters and demodulates a signal that is received from the phase error correction (PEC) unit 235 to obtain a demodulated binary reference sequence. This binary reference sequence is fed into the decision feedback equalization controller 255 for joint processing with the data signal coming from frequency error correction unit 220.

The phase error correction unit 235 that provides a signal to the non-coherent detection unit 225 receives an output signal from the frequency error correction unit 220. That is, the frequency control and the phase control is done in two separate stages, and the phase error correction is performed based on a signal that has previously been corrected with respect to a frequency error.

As apparent from the figure, the phase error correction unit 235 further provides an input signal to the feedback filter 260 of the decision feedback equalizer 245. The feedback filter 260 filters this data to provide output data, and it is controlled by the decision feedback equalization controller 255. Further, the feedback filter 260 may receive a signal which is indicative of the data rate.

Moreover, there is provided a packet start detection (PST) unit 230 that detects the start of frame delimiter (SFD) portion in the received data signal to generate a packet start control signal. For this purpose, the packet start detection unit 230 receives input from the non-coherent detection unit 225.

In the present embodiment, an average tracking mechanism is provided in the preamble detection unit 215. As mentioned above, the preamble detection unit 215 is provided for scanning the incoming data stream for a preamble while the receiver is in the receive mode. The purpose of the preamble detector 215 is therefore to detect a preamble and to determine whether a short or a long preamble is received. It will also determine the boundaries between consecutive Barker symbols such that the following processing blocks can adjust their processing schedule accordingly. Since the average tracking mechanism of the present embodiment is implemented within the preamble detection unit 215, the following is a more detailed discussion of this unit.

Figure 3:
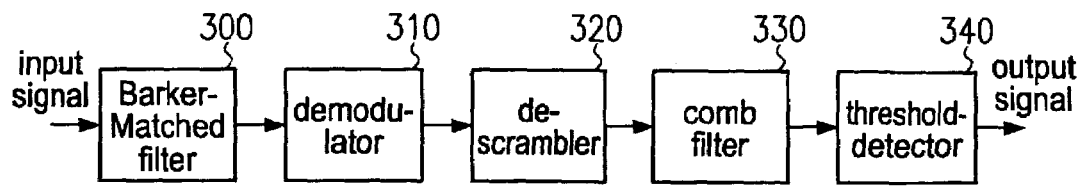
FIG. 3 illustrates the components of the preamble detector shown in FIG. 2.

Referring now to FIG. 3 which illustrates the components of the preamble detection unit 215, a Barker-matched filter 300 is provided for correlating a Barker spreading code. The output of the Barker-matched filter 300 is fed to a demodulator 310 that differentially demodulates the received signal and feeds the demodulated signal to a descrambler 320. As the output of the demodulator 310 is still scrambled, the task of the descrambler 320 is to descramble the received data stream. The output of the descrambler 320 is then fed to a comb filter 330 and finally, there is a threshold detector 340 that compares the output of the comb filter 330 with a threshold value for determining whether a preamble is detected and/or whether the detected preamble is a short preamble or a long preamble.

The comb filter 330 is provided to smooth the output of the demodulator 310. That is, the present embodiment has an average tracking mechanism provided in the comb filter 330 of the preamble detector 210.

For discussing the average tracking mechanism of the present embodiment it is assumed that the receiver is a 802.11b compliant WLAN receiver that operates in the 1 or 2 Mbps mode. In these modes, the code length is 11 (Barker sequence) and the symbol rate is 1 Msps with 1 or 2 bits per symbol in the 1 or 2 Mbps mode, respectively. For averaging amplitudes over ten samples at any time, the preamble detector would be required to store 220 complex data samples, i.e., 440 real samples $d_I$, $d_Q$. The 22 average values indexed by n=0 . . . 21 would then be given by:

$$f_{n,I}(k) = \frac{1}{10}\sum_{i=0}^{9} d_I(k-22i)$$

$$f_{n,Q}(k) = \frac{1}{10}\sum_{i=0}^{9} d_Q(k-22i)$$

To provide an alternative to storing ten samples for each of twenty-two real and twenty-two imaginary average values, i.e. 440 samples, the comb filter 330 of the present embodiment includes an approximation mechanism to approximate the above shown average values by functional values that can be obtained in a more simple and thus more efficient manner:

$$f_{n,I}(k) \approx \tilde{f}_{n,I}(k)$$

$$f_{n,Q}(k) \approx \tilde{f}_{n,Q}(k)$$

In this embodiment, the approximate values are calculated by retrieving a previously calculated approximate value $\tilde{f}_{n,I}(k-22), \tilde{f}_{n,Q}(k-22)$ and calculating a weighted sum of the retrieved approximate value and the current data sample $d_I(k), d_Q(k)$:

$$\tilde{f}_{n,I}(k) = \begin{cases} a \cdot d_I(k) + (1-a) \cdot \tilde{f}_{n,I}(k-22) & \text{if } k = 22 \cdot m, m = \text{integer} \\ \tilde{f}_{n,I}(k-1) & \text{otherwise} \end{cases}$$

$$\tilde{f}_{n,Q}(k) = \begin{cases} a \cdot d_Q(k) + (1-a) \cdot \tilde{f}_{n,Q}(k-22) & \text{if } k = 22 \cdot m, m = \text{integer} \\ \tilde{f}_{n,Q}(k-1) & \text{otherwise} \end{cases}$$

As apparent from these equations, an updated approximate value is calculated in time distances of 22 data samples, since n=0 . . . 21. When no calculation is done, i.e. the approximate value is not updated, the most recently calculated approximate value is output. When the approximate value is updated, substantially the following approximation is done:

$$\frac{1}{10}[d_{I,Q}(k) + d_{I,Q}(k-22) + K + d_{I,Q}(k-198)] \approx$$

$$a \cdot d_{I,Q}(k) + b \cdot \tilde{f}_{n,I,Q}(k-22)$$

That is, a first weighting factor a is used to be multiplied with the current data sample $d_I, d_Q$ to calculate a weighted value of the current data sample. A second weighting factor b is multiplied with the retrieved approximate value $\tilde{f}_{n,I}(k-22), \tilde{f}_{n,Q}(k-22)$ to calculate a weighted value of the retrieved approximate value. The second weighting factor b may be arbitrarily chosen, and in the above embodiment it has a value that depends on the first weighting factor. In particular, the second weighting factor b is chosen to be 1−a. Thus, the sum of the values of both the first and the second weighting factors is one.

As will be apparent in more detail from the description below, the approximation approach of the embodiment does not need 10 samples for each average value that is to be calculated but may achieve an approximation simply by using one data sample only, in combination with a previously approximated value. Thus, the embodiment significantly reduces the memory effort from 440 samples to 44 samples and even reduces computation effort.

Figure 4:
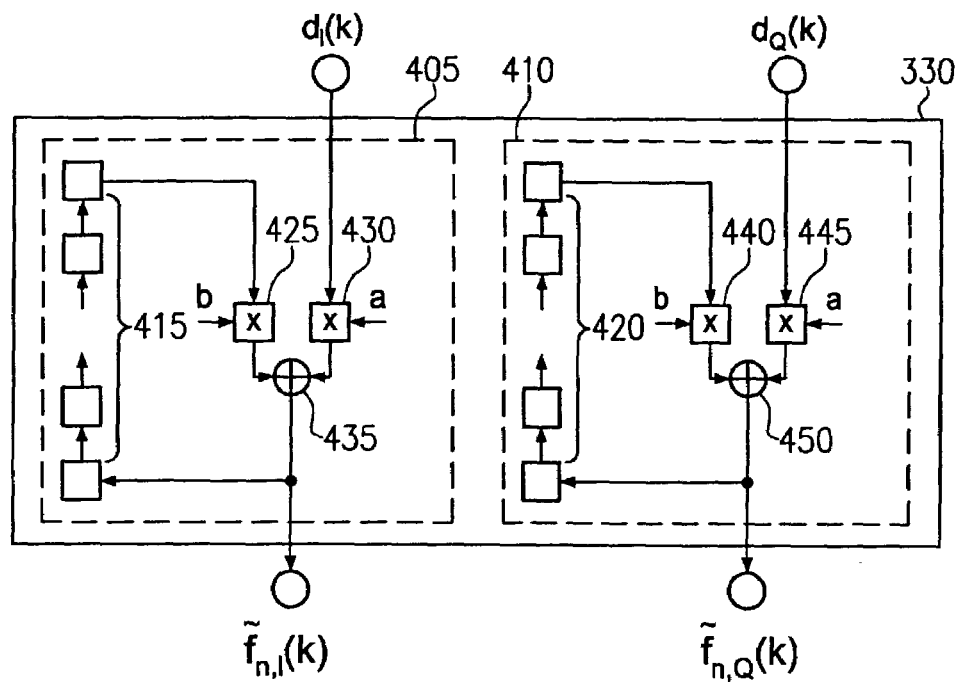
FIG. 4 illustrates the components of the comb filter according to one embodiment that is a part of the preamble detector shown in FIG. 3.

Turning now to FIG. 4, a hardware implementation of the comb filter 330 of the present embodiment is depicted. As apparent therefrom, the comb filter 330 comprises two subunits 405, 410 for calculating approximate values for the real and imaginary parts of the data samples, respectively. In each subunit 405, 410, a multiplier 430, 445 is provided for weighting the current data sample that is input to the circuit, with the first weighting factor a. Further, a storage unit 415, 420 is provided in each subunit 405, 410. Each storage unit of the present embodiment is a sequence of register elements 415, 420 where each register element is for storing one of the previously calculated approximate values. The number of register elements in each sequence 415, 420 is 22. The sequence of register elements is controlled to act as a shift register.

The first one of the register elements stores the last calculated approximate value. The last element in the sequence is connected to another multiplier 425, 440 that multiplies the approximate value retrieved from this register element with the second weighting factor b which may, or may not, be equal to 1−a.

Each subunit 405, 410 further comprises an adder 435, 450 that is connected to receive the multiplication outputs from both multipliers 425, 430 or 440, 445 and that calculates the sum of both values. The sum of the weighted value of the current data sample and the weighted value of the retrieved approximate value is the currently updated approximate value. This value is output, and it is fed to the first one of the registers 415, 420.

By feeding the sequence of registers with the newly updated approximate value, and retrieving a previous approximate value from the other end of the sequence, the registers actually form a ring buffer.

The approximation of the average function by the simple circuit of FIG. 4 provides a valid approach to detect a preamble without unduly degrading the performance of the modem. This is demonstrated by the simulation results shown in FIG. 5. In the depicted diagram, the packet error rate performance of a 802.11b modem in the fading channel is shown. In detail, the curves 500, 520, 540, 560 show the performance of the modem using the true average values, while curves 510, 530, 550, 570 are the corresponding curves when applying the approximation technique of the embodiment. The curves show that in the fading channel the performance of the modem does not degrade due to the average approximation technique.

Figure 5:
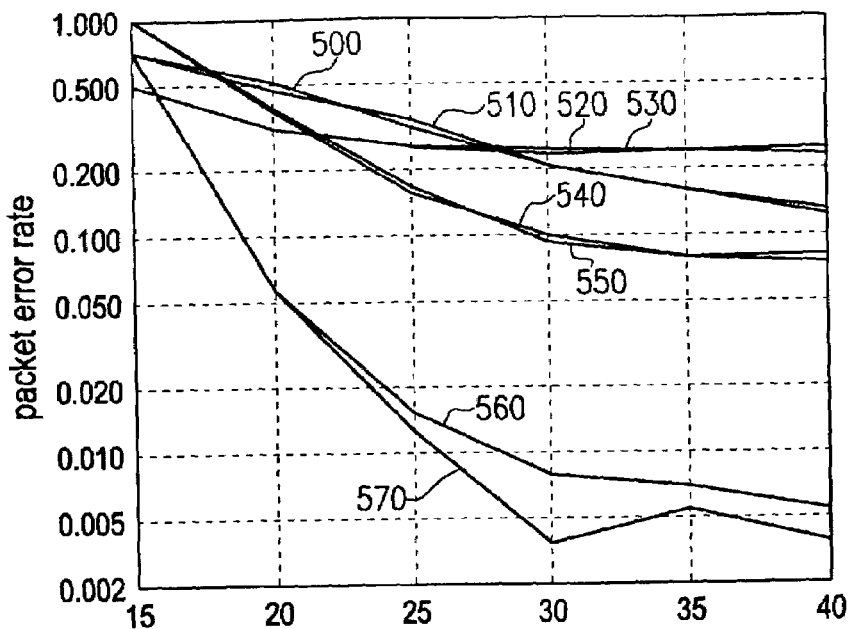
FIG. 5 is a graph demonstrating the high quality of the approximation technique according to the embodiments.

While the testing of FIG. 5 uses BER (Bit Error Rate) simulations in the fading channel which clearly show that (nearly) no performance penalty is involved with using the approximation technique of the embodiment, a similar result can be obtained using the AWGN (Additive White Gaussian Noise) channel only.

Figure 6:
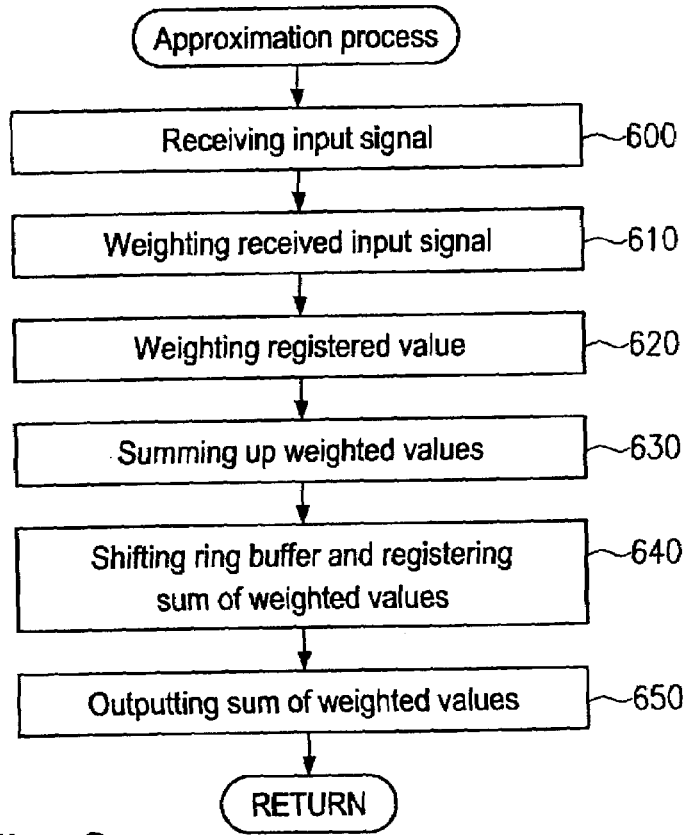
FIG. 6 is a flowchart illustrating an approximation process according to an embodiment.

Turning now to FIG. 6, a flowchart is depicted for illustrating the approximation process that may be performed in the comb filter 330 of the preamble detection unit 215 in the WLAN receiver. In step 600, input signals are received which may be complex data samples. The received input signals are then weighted in step 610. Further, a previous approximate value is retrieved and weighted in step 620. The weighted values are then summed up in step 630 to calculate an updated approximate value. The updated approximate value is then registered in the ring buffer in step 640 and output to allow the preamble detector 215 to determine whether a preamble is currently received or not.

It is to be noted that the sequence of method steps shown in the flowchart of FIG. 6 is chosen for illustration purposes only and may be changed in another embodiment. In particular, the weighting steps 610, 620 may be even performed simultaneously and similarly, the shifting and outputting steps 640, 650 may be performed simultaneously.

Figure 7:
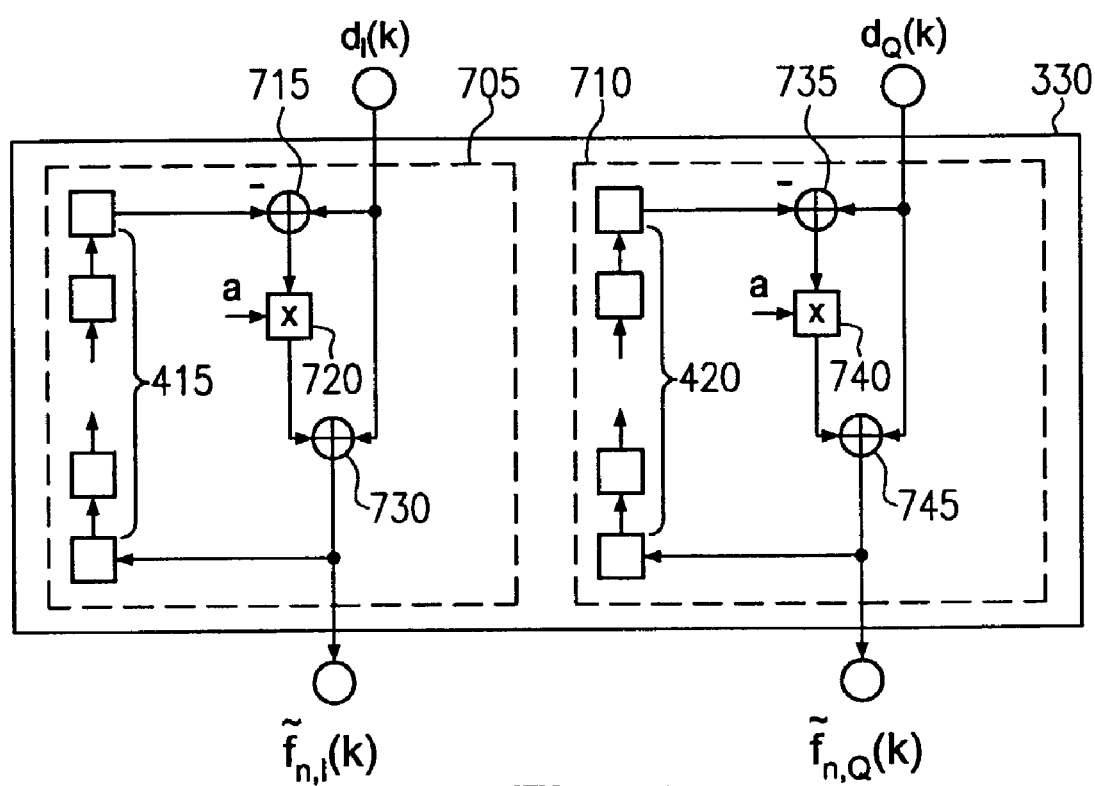
FIG. 7 illustrates the components of the comb filter according to another embodiment that is a part of the preamble detector shown in FIG. 3.

Another embodiment of a hardware implementation of the comb filter 330 is depicted in FIG. 7. As apparent therefrom, the comb filter 330 comprises two subunits 705, 710 which substantially correspond to the subunits 405, 410 of the arrangement shown in FIG. 4. However, the second weighting factor b of the present embodiment is chosen to be 1−a where a is the first weighting factor. This allows for further simplifying the circuit implementation by reducing the number of multipliers in each subunit 705, 710 to one:

$$a \cdot d_{I,Q}(k) + (1-a) \cdot \tilde{f}_{n,I,Q}(k-22) =$$
$$a \cdot [d_{I,Q}(k) - \tilde{f}_{n,I,Q}(k-22)] + \tilde{f}_{n,I,Q}(k-22)$$

As can be seen from FIG. 7, there is provided in each subunit 705, 710 only one multiplier 720, 740, in addition to two adders 715, 730 or 735, 745.

As apparent from the foregoing description of the embodiments, the gate count may be reduced in the embodiments by an amount of up to 80%, leading to a significantly reduced hardware amount necessary to implement an average tracking mechanism. This advantageously saves die area and thus reduces development and manufacturing costs as well as power consumption during circuit operation. Improving the circuit density therefore improves both the efficiency and the overall performance. The use of a ring buffer further results in additional savings for selection logic devices which would be required to be implemented in the path before the multipliers and adders.

While the above embodiments have been described as being implemented in a comb filter of a preamble detector in a WLAN receiver, it is to be noted that the average approximation technique of the embodiments may likewise be used in any other unit and for any other purpose within a receiver in a data communications systems. Further, the embodiments are advantageous in FPGA (Field Programmable Gate Array) implementations where it might be a requirement to reduce the number of registers as far as possible.

Moreover, while the above embodiments use complex data samples, it is to be noted that the approximation technique of the embodiments may likewise be used in data communication receivers where the data samples are non-complex.

Further, it is to be noted that in other embodiments, an approximation of average functions may be provided where the number of most recently received data samples over which the average is estimated, may differ from the number of ten. Furthermore, embodiments may exist where the data samples occurring the average function are not equidistant or are equidistant with a distance different from twenty-two.

While the invention has been described with respect to the physical embodiments constructed in accordance therewith, it will be apparent to those skilled in the art that various modifications, variations and improvements of the present invention may be made in the light of the above teachings and within the purview of the appended claims without departing from the spirit and intended scope of the invention. In addition, those areas in which it is believed that those of ordinary skill in the art are familiar, have not been described herein in order to not unnecessarily obscure the invention described herein.

Accordingly, it is to be understood that the invention is not to be limited by the specific illustrative embodiments, but only by the scope of the appended claims.

What is claimed is:

1. A receiver for receiving data in a data communications system, comprising:
   an average tracking mechanism coupled to receive an input stream of data samples and operable to keep track of an average over a predefined number of most recently received data samples, wherein said average tracking mechanism comprises:
   a calculation unit operable to calculate an approximate value of said average; and
   a storage unit for storing calculated approximate values, wherein said calculation unit is operable to calculate said approximate value by retrieving a previously calculated approximate value from said storage unit and calculating a weighted sum of said retrieved previously calculated approximate value and a current data sample.

2. The receiver of claim 1, further comprising:
   a preamble detector for detecting a preamble in a received data stream,
   wherein said average tracking mechanism is comprised in said preamble detector.

3. The receiver of claim 2, wherein said preamble detector comprises a comb filter and said average tracking mechanism is comprised in said comb filter.

4. The receiver of claim 2, wherein said preamble detector comprises a threshold detector coupled to receive from said average tracking mechanism said weighted sum of said retrieved previously calculated approximate value and said current data sample, to determine whether or not a preamble is detected in the received data stream.

5. The receiver of claim 1, wherein said predefined number of most recently received data samples is a set of equidistant data samples in said input stream.

6. The receiver of claim 5, wherein said predefined number is ten.

7. The receiver of claim 5, wherein a distance between said equidistant data samples is twenty-two.

8. The receiver of claim 5, wherein said calculation unit is operable to calculate said approximate value in given time distances only, and when no calculation is done, to output a most recently calculated approximate value, wherein said given time distance corresponds to a distance between said equidistant data samples.

9. The receiver of claim 1, wherein said storage unit is coupled to said calculation unit to receive a currently calculated approximate value from said calculation unit and to output an earliest approximate value to said calculation unit.

10. The receiver of claim 9, wherein said storage unit comprises a sequence of register elements, each register element operable to store one of said calculated approximate values.

11. The receiver of claim 10, wherein said sequence of register elements is controlled to act as a shift register.

12. The receiver of claim 9, wherein said storage unit is a ring buffer.

13. The receiver of claim 1, wherein said calculation unit comprises:
   a first multiplier coupled to receive a first weighting factor and said current data sample, and operable to multiply said first weighting factor with said current data sample to calculate a weighted value of said current data sample.

14. The receiver of claim 13, wherein said calculation unit further comprises:
a second multiplier coupled to receive a second weighting factor and said retrieved previously calculated approximate value, and operable to multiply said second weighting factor with said retrieved previously calculated approximate value to calculate a weighted value of said retrieved previously calculated approximate value.

15. The receiver of claim 14, wherein said second weighting factor is chosen to have a value dependent on a value of said first weighting factor.

16. The receiver of claim 15, wherein a sum of the values of both the first and the second weighting factors is one.

17. The receiver of claim 14, wherein said calculation unit further comprises:
an adder coupled to said first and second multipliers to receive said weighted value of said current data sample and said weighted value of said retrieved previously calculated approximate value and output a sum of the received weighted values.

18. The receiver of claim 1, wherein said input stream of data samples is an input stream of complex data samples and said average tracking mechanism is operable to separately keep track of an average over a predefined number of most recently received real and imaginary parts of said complex data samples.

19. The receiver of claim 1, wherein said average tracking mechanism is FPGA (Field Programmable Gate Array) implemented.

20. The receiver of claim 1, being a WLAN (Wireless Local Area Network) receiver.

21. An integrated circuit chip having average tracking circuitry coupled to receive an input stream of data samples and operable to keep track of an average over a predefined number of most recently received data samples, wherein said average tracking circuitry comprises:
a calculation circuit operable to calculate an approximate value of said average; and
a storage circuit for storing calculated approximate values,
wherein said calculation circuit is operable to calculate said approximate value by retrieving a previously calculated approximate value from said storage circuit and calculating a weighted sum of said retrieved previously calculated approximate value and a current data sample.

22. A method of operating a receiver in a data communications system, comprising:
receiving an input stream of data samples; and
performing an average tracking process to keep track of an average over a predefined number of most recently received data samples, said average tracking process comprising:
retrieving a stored, previously calculated approximate value of said average; and
calculating a current approximate value by calculating a weighted sum of said retrieved previously calculated approximate value and a current data sample.

23. The method of claim 22, further comprising:
detecting a preamble in a received data stream,
wherein said preamble detection comprises said average tracking process.

24. The method of claim 23, wherein said preamble detection comprises:
operating a comb filter,
wherein said comb filter operation comprises said average tracking process.

25. The method of claim 23, wherein said preamble detection comprises:
comparing said weighted sum of said retrieved previously calculated approximate value and said current data sample, with a threshold.

26. The method of claim 22, wherein said predefined number of most recently received data samples is a set of equidistant data samples in said input stream.

27. The method of claim 26, wherein said predefined number is ten.

28. The method of claim 26, wherein a distance between said equidistant data samples is twenty-two.

29. The method of claim 26, wherein said calculating the current approximate value is operable to calculate said approximate value in given time distances only, and when no calculation is done, to output a most recently calculated approximate value, wherein said given time distance corresponds to a distance between said equidistant data samples.

30. The method of claim 22, further comprising:
storing said current approximate value.

31. The method of claim 30, wherein said storing said current approximate value comprises:
operating a sequence of register elements, wherein each register element is operable to store one of said calculated approximate values.

32. The method of claim 31, wherein said storing said current approximate value comprises:
controlling said sequence of register elements to act as a shift register.

33. The method of claim 30, wherein said storing said current approximate value comprises:
operating a ring buffer.

34. The method of claim 22, wherein calculating said weighted sum comprises:
receiving a first weighting factor;
receiving said current data sample; and
multiplying said first weighting factor with said current data sample to calculate a weighted value of said current data sample.

35. The method of claim 34, wherein calculating said weighted sum further comprises:
receiving a second weighting factor;
receiving said retrieved previously calculated approximate value; and
multiplying said second weighting factor with said retrieved previously calculated approximate value to calculate a weighted value of said retrieved previously calculated approximate value.

36. The method of claim 35, wherein said second weighting factor is chosen to have a value dependent on a value of said first weighting factor.

37. The method of claim 36, wherein a sum of the values of both the first and the second weighting factors is one.

38. The method of claim 35, wherein calculating said weighted sum further comprises:
adding said weighted value of said current data sample and said weighted value of said retrieved previously calculated approximate value; and
outputting a sum of the weighted values.

39. The method of claim 22, wherein said input stream of data samples is an input stream of complex data samples and said average tracking process is operable to separately keeptrack of an average over a predefined number of most recently received real and imaginary parts of said complex data samples.

40. The method of claim 22, wherein said average tracking process is FPGA (Field Programmable Gate Array) implemented.

41. The method of claim 22, for operating a WLAN (Wireless Local Area Network) receiver.

* * * * *